UNITED STATES PATENT OFFICE.

CARL DITTMAR, OF BOSTON, MASSACHUSETTS.

IMPROVEMENT IN EXPLOSIVE COMPOUNDS.

Specification forming part of Letters Patent No. 145,403, dated December 9, 1873; reissue No 5,759, dated February 10, 1874; application filed February 3, 1874.

*To all whom it may concern:*

Be it known that I, CARL DITTMAR, of Boston, Suffolk county, State of Massachusetts, have invented a Preparation of Vegetable Fiber, of which the following is a specification:

I use vegetable fiber of any kind, raw or manufactured, (as old linen or cotton rags, &c.,) which I render to a fine pulp in the same manner as it is done in the manufacture of paper, with similar machinery, by open fire, common steam or superheated steam, and chemicals. The greatest care must be taken to render the fiber chemically pure, by bleaching it and treating it with acids and alkalies, and outwashing those chemicals; after that I prepare this chemically pure pulp in different ways 1. I press it in sheets of about one-sixteenth part of an inch in thickness. This thickness may be lessened or increased to suit the grains to the purposes to which the powder shall be used. These plates or sheets are first dried thoroughly, and then passed under a punching-machine with punches of the same diameter as the thickness of the sheets. The cylinders received in this manner I use for the best kind of powder. The remainder or whole sheets of the pulp pass through rollers with cutters around the periphery—one pair of cutters cutting in the one direction, another pair cutting it across in a line at a right angle to the former, so as to give grains of a square form; or the pulp may be formed into grains by any other method. The grains I treat now with a mixture of nitric and sulphuric acid, in the same manner as it is done in the manufacture of gun-cotton.

2. The pulp is dried and stirred up during the drying process, so that it cannot bake together into large lumps. The small lumps pass through a grinding-mill, and are to be ground to the finest dust. This dust is treated, as above, with nitric and sulphuric acids.

3. The pulp is soaked in a solution of sugar, or mannite, or amylum, or inuline, or similar substances, pressed in sheets and cut, as above, or formed into grains by any other method, or ground to dust after it has been dried, and then treated with the mixture of nitric and sulphuric acid, as above. The greatest care has to be taken then to wash the superfluous acid out again, which is more difficult than by the former two processes. After this has been done, it is soaked in a solution of soda, pressed out, and then soaked in a solution of nitrate of potash, or chlorate of potash, or similar substances, and then carefully dried. It is ready then for use; or it can be soaked after that, for blasting purposes only, with nitro-glycerine, &c. The combination of the vegetable fiber with sugar, &c., gives a very powerful explosive, and overcomes the difficulty in preparing sugar, &c., alone with acids.

4ª. The pulp may be treated with a solution of soda, or nitrate of potash, or chlorate of potash, or similar chemicals; solution of sugar may also be added; then put up in sheets and grains, as above, or ground to dust, and then soaked with nitro-glycerine, or similar substances; or the soda and saltpeter may be added in a fine state after the drying process, when not soaked before in the solution, the first giving a better kind of powder. This kind is only for blasting purposes, or it can be used to fill shells with, the great elasticity of the material preventing it from exploding prematurely from the shock when fired in a cannon.

4ᵇ. After the pulp has been treated with the solution of soda, saltpeter, sugar, &c., it is pressed in forms of a cylindrical size of different diameter, so as to form a cartridge for blasting purposes, the forms having a pin on one end, so as to leave a hole in the cartridge for the insertion of the fuse or cap. These cylinders are dried thoroughly, and soaked then with nitro-glycerine, or similar substances, and then coated with a water-proof preparation. The powder-dust resulting from the processes Nos. 3 and 4ª may be pressed in cylinders in the same manner and coated with a water-proof varnish, &c.

5. The chemically pure pulp, prepared with sugar, &c., or not, is put up in thinner sheets, like common paper, either before treating it with saltpeter solution, &c., or after that, in both cases dried thoroughly, and in the first case treated with nitric and sulphuric acid, and then with the solution of saltpeter, &c., and dried again, to be used as it is, or soaked with nitro-glycerine, &c. In both cases it is cut in suitable pieces, and these rolled up tight, so as to give smaller or larger cartridges for guns or for drill-holes, or, if pressed flat, for crevices. These cartridges can be coated, as above, with a water-proof preparation.

All the within-mentioned compounds, formed without the use of nitro-glycerine, can be used for the manufacture of fire-works, chiefly saloon and theater fire-works, as being better adapted for these purposes than common powder, in giving out neither smoke nor smell, and also for gunning or artillery purposes, in leaving no residuum and requiring no cleansing while in use. All these compounds can be kept wet for any length of time, and therefore be stored and transported with safety in the largest quantities, like common merchandise, or even better than that, being impossible to be set on fire or exploded by concussion.

Before use it may be dried by spreading the compound out in the sun or in a warm room, or by any other drying process. The grains remain whole if kept under water, which is not the case when gun-cotton is pulped and grained. Grains made by my process have also a greater resistance against any mechanical treatment, by handling, transporting, &c., no dust resulting from it.

The different explosive compounds manufactured in the different ways above described may be mixed together in different proportions, so as to give different strength, as may be required. The different compounds may be mixed with prepared or unprepared charcoal.

In preparing the vegetable fiber in the manner above described, I make a very powerful explosive compound with the greatest safety, as the fineness to which the vegetable fiber is reduced by the destruction of the vegetable texture before the treatment with chemicals allows a more thorough action of the chemicals, giving, therefore, more strength and uniformity, and, as the great elasticity of the material gives the greatest resistance against concussion, it is safer than any other similar explosive. Being made up in grains, cylinders, or cartridges of any size or form, either coated or not coated with a water-proof material, ready for use, it is very convenient in the practice.

Every one of the above-described compounds can be fired by means of a percussion-cap, or, like common powder, with a fuse, when well confined.

The vegetable fiber prepared as herein described is the best adapted substance to be combined with nitro-glycerine, as it takes and holds as much nitro-glycerine as the infusorial earth, having the preference of not leaving from twenty to twenty-five per cent. residuum, and adding to the strength of the compound, being resolved in gases by the explosion.

Having thus described my invention, what I claim, and desire to secure by Letters Patent, is—

1. The herein-described process of treatment of vegetable fiber, the same consisting in first reducing the fiber to a pulp, then rendering the pulp chemically pure, and then reducing it to a granulated or powdered or compact condition, to be then treated with materials to render the same explosive, all substantially as herein described.

2. The herein-described process of treatment of vegetable fiber, the same consisting in first reducing the fiber to a pulp, then rendering the pulp chemically pure, and then preparing it with a solution of sugar, or mannite, or amylum, or inuline, or other substances, substantially as herein described, and then reducing such prepared pulp to a granulated or powdered or compact condition, to be then treated with materials to render the same explosive, all substantially as herein described.

The above specification of my invention signed by me this 5th day of January, 1874.

CARL DITTMAR.

Witnesses:
ALBERT W. BROWN,
J. R. MCELROY.